A. E. COOK.
AGRICULTURAL IMPLEMENT.
APPLICATION FILED OCT. 23, 1908.
1,129,170.
Patented Feb. 23, 1915.
6 SHEETS—SHEET 1.
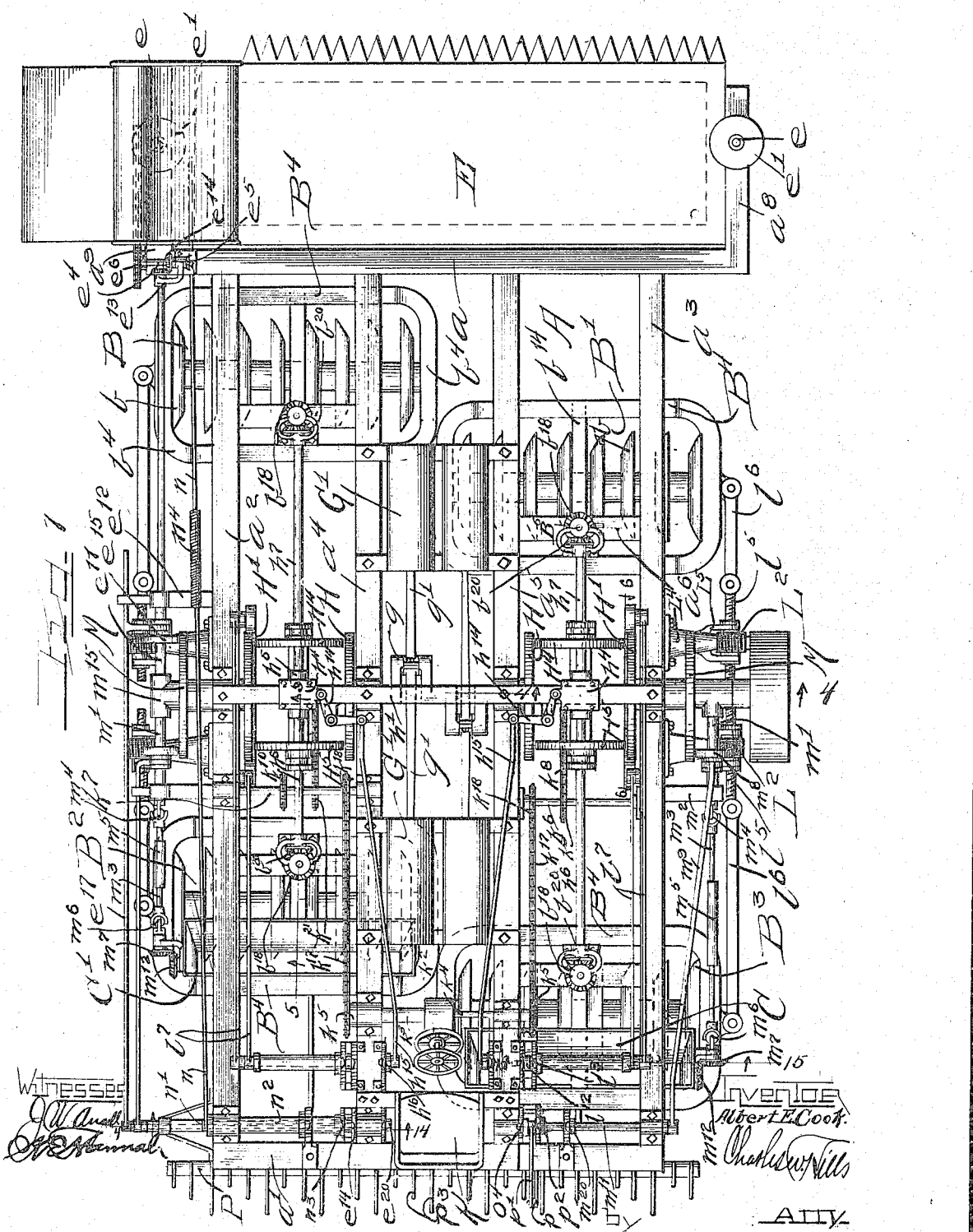

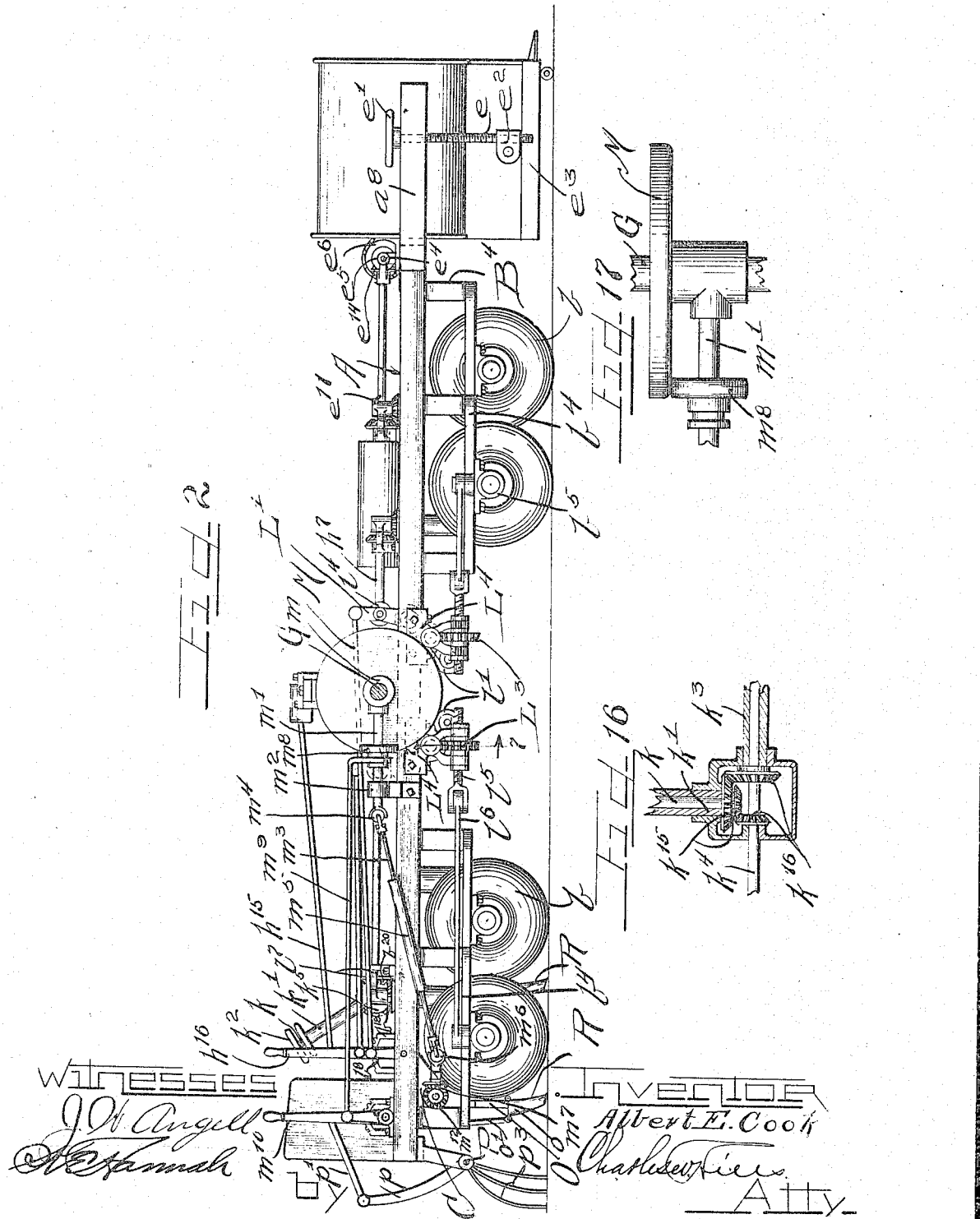

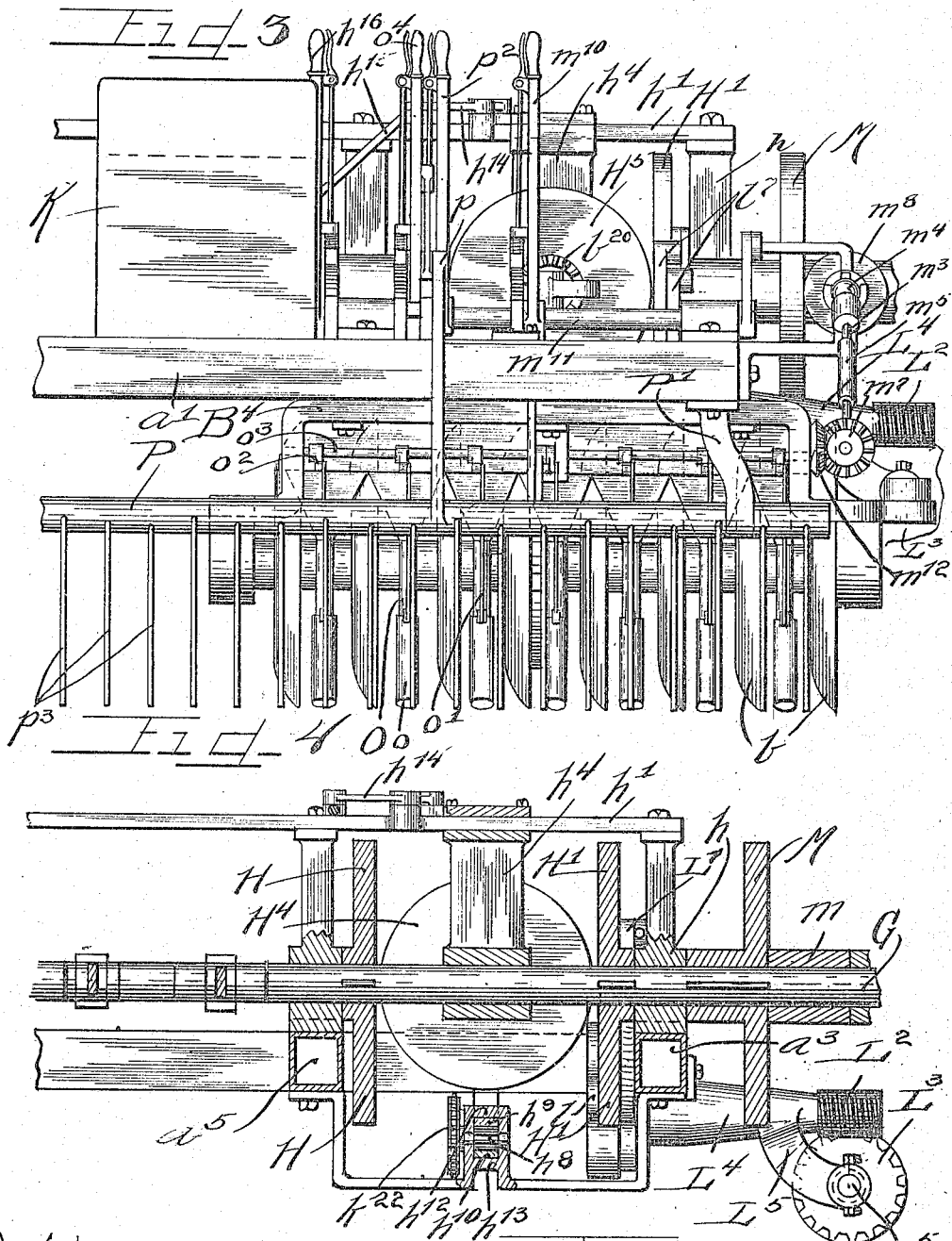

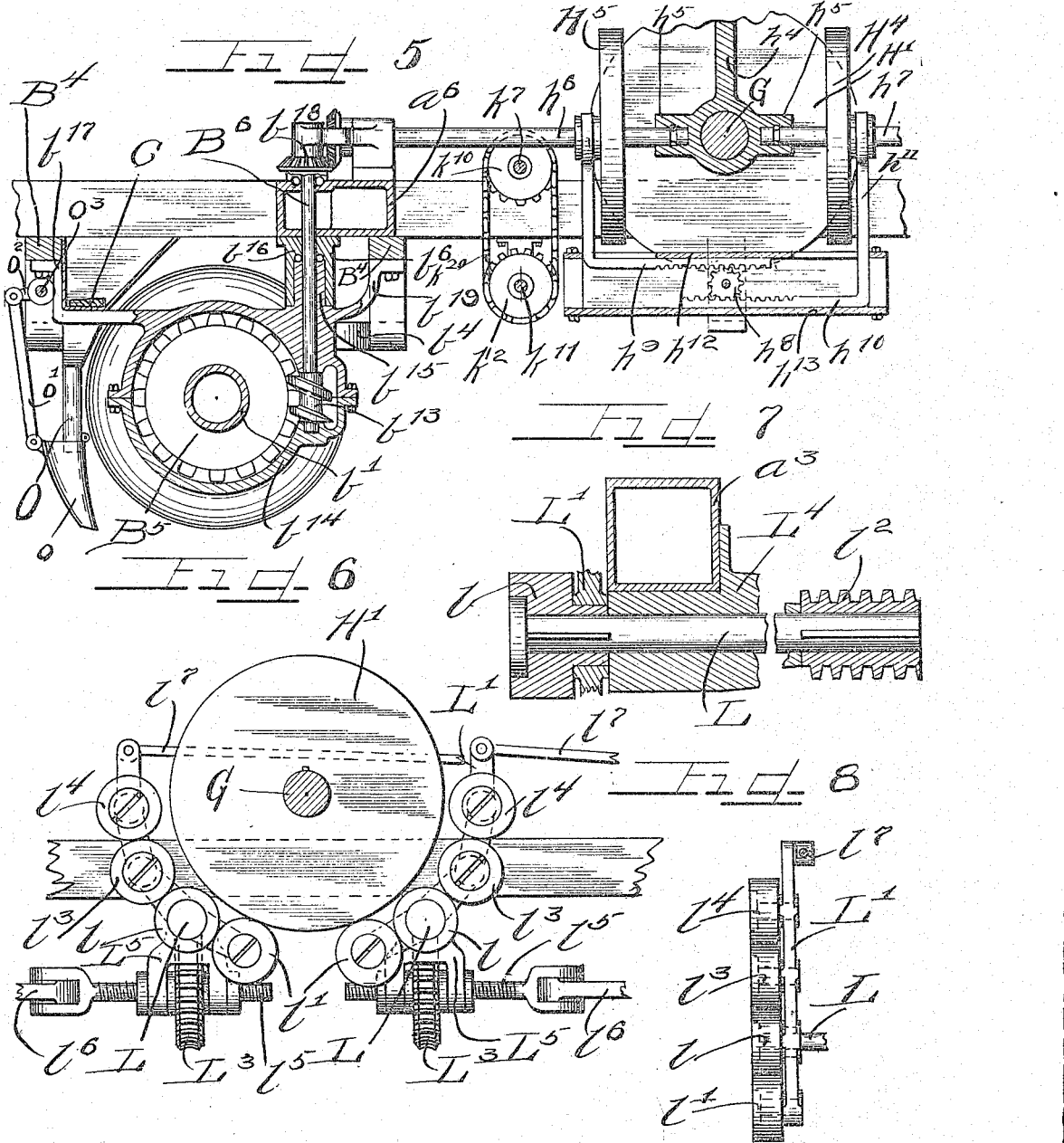

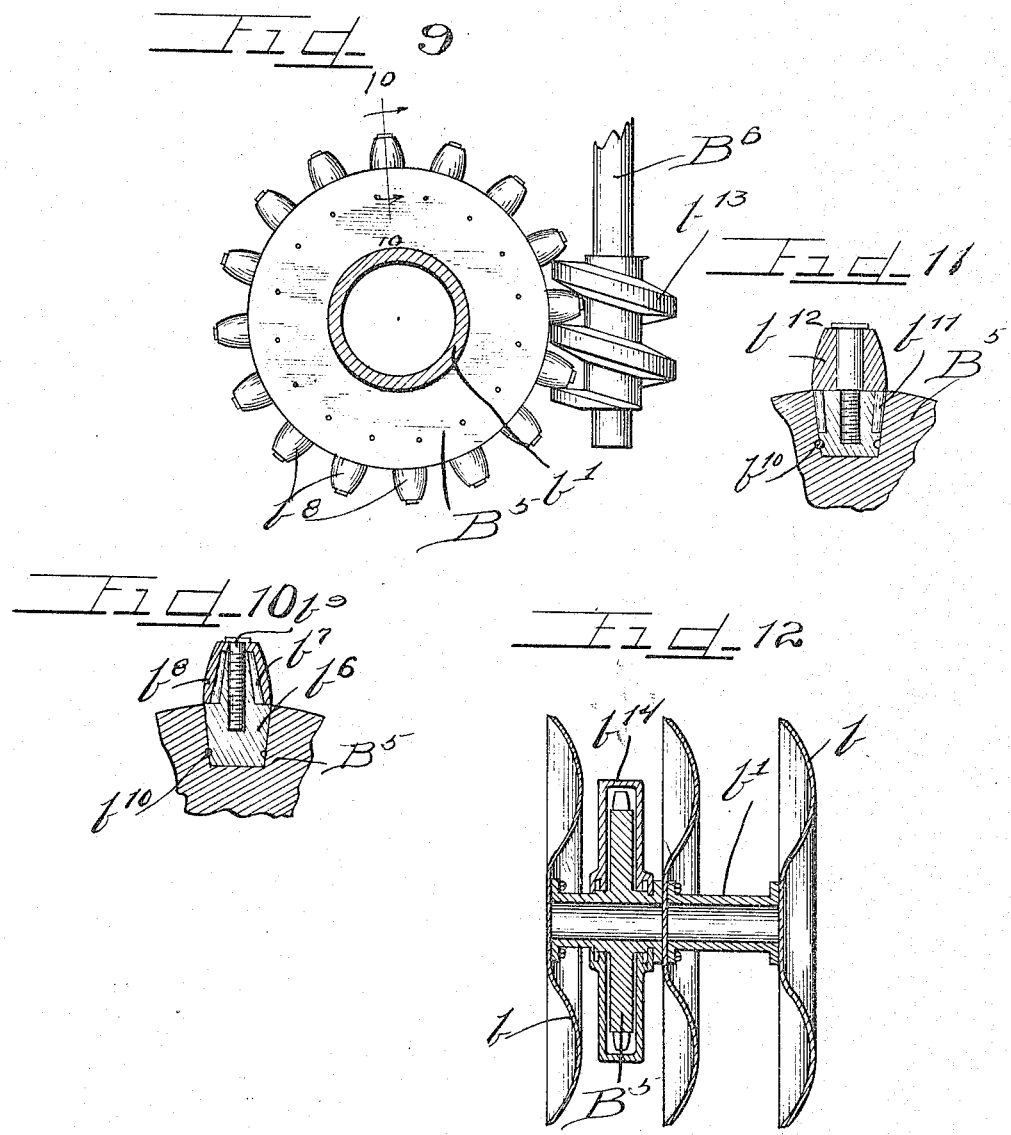

A. E. COOK.
AGRICULTURAL IMPLEMENT.
APPLICATION FILED OCT. 23, 1908.
1,129,170.
Patented Feb. 23, 1915.
6 SHEETS—SHEET 6.
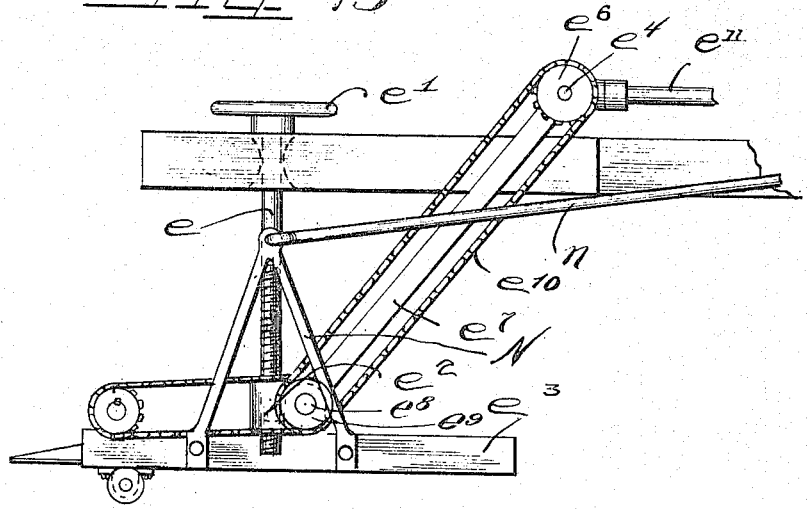
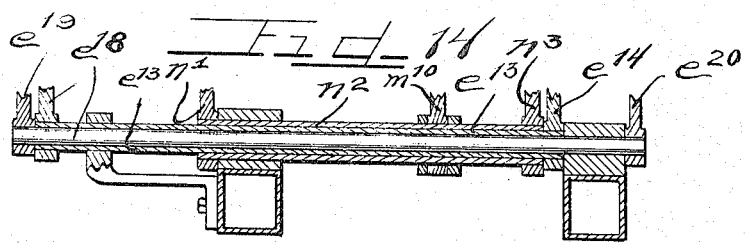
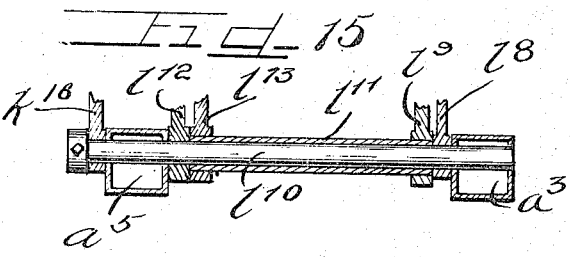

UNITED STATES PATENT OFFICE.

ALBERT E. COOK, OF ODEBOLT, IOWA.

AGRICULTURAL IMPLEMENT.

1,129,170.   Specification of Letters Patent.   Patented Feb. 23, 1915.

Application filed October 23, 1908.   Serial No. 459,139.

*To all whom it may concern:*

Be it known that I, ALBERT E. COOK, a citizen of the United States, and a resident of the city of Odebolt, county of Sac, and State of Iowa, have invented certain new and useful Improvements in Agricultural Implements; and I do hereby declare that the following is a full, clear, and exact description of the same, reference being had to the accompanying drawings, and to the letters of reference marked thereon, which form a part of this specification.

On many of the larger farms in this and other countries, it is necessary in cultivating the soil to economize to the greatest possible extent in the labor of teams and men, owing to the very large areas to be covered and owing to the fact that if such farms are to be economically conducted and at a profit, it is necessary to simplify the labor to the greatest possible extent and to enable an operator with a suitable machine to perform as many of the necessary operations in gathering the crop, stirring the soil, and planting a new crop, as it is possible to combine in going once over the field.

The object of this invention is to provide a machine for preparing the soil and planting a crop at one operation and provided with propelling means which simultaneously advances the machine and operates the planter or dropper and also may serve to cut the material in the path of the machine by the use of suitable cutting mechanisms.

It is also an object of the invention to afford an automobile implement of the class described wherein the supporting wheels or disks serve both to support and propel the machine and also to open the soil to receive the seed.

It is also an object of the invention to afford in combination with an automobile frame, supporting cultivating disks serving the purpose of wheels in the propulsion of the machine and operating as plows in opening the soil, and to afford in connection therewith seed dropping mechanisms whereby the seed for a new crop may be dropped at the rear of the disks as the soil is turned.

It is a very important object of this invention to afford a planting machine provided with mechanism for clearing the soil in advance thereof, of a previous crop, or of weeds or of refuse, said machine as a whole being supported upon power operated disks which serve to turn or plow the soil and open the same in advance of the seed dropping mechanisms, said machine also being provided with means for covering the seed after the same has been dropped.

Another important object of my invention is to afford supporting and driving disks, which, although serving as wheels to support and propel the machine, are specially shaped to open and turn the soil in advance of the seed dropping mechanisms, said disks being so formed as to turn a furrow.

The invention embraces many novel features, and consists in the matters hereinafter described and more fully pointed out and defined in the appended claims.

In the drawings: Figure 1 is a top plan view of a machine embodying my invention. Fig. 2 is a side elevation thereof partly in section. Fig. 3 is an enlarged rear elevation of the same, showing the same broken away. Fig. 4 is a section taken on line 4—4 of Fig. 1. Fig. 5 is a section taken on line 5—5 of Fig. 1. Fig. 6 is a section taken on line 6—6 of Fig. 1. Fig. 7 is a section taken on line 7—7 of Fig. 2. Fig. 8 is a detail view of the friction drive for varying the angular relation of the disks with the main frame. Fig. 9 is an enlarged detail view of the worm drive for the disks shown, in Fig. 5. Fig. 10 is a fragmentary section on line 10—10 of Fig. 9. Fig. 11 is a similar fragmentary section illustrating a slightly modified construction of the conical gear tooth. Fig. 12 is an enlarged fragmentary view of a part of one set of disks showing the same in section longitudinally of the tubular shaft. Fig. 13 is an enlarged, fragmentary detail side elevation illustrating the drive for the cutting mechanism. Fig. 14 is a section taken on line 14—14 of Fig. 1. Fig. 15 is a section taken on line 15—15 of Fig. 1. Fig. 16 is a fragmentary detail of part of the mechanism for changing the speed of the gangs. Fig. 17 is a fragmentary detail of the transmission for the seeder.

As shown in the drawings: The machine consists of a suitable frame indicated as a whole by A, and supported upon gangs of cultivating or plowing disks, as shown four in number, indicated by B—B′—B²—B³; and which serve the double function of supporting and propelling the machine in lieu of wheels, and also serve to plow or open the soil for the reception of the seed from the seed-dropping mechanisms C—C'. The machine also possesses covering mechanism at the rear of the seeder for covering the seed after the same are dropped. To clear the soil in advance of the machine for the satisfactory operation of the machine or for the harvesting of the previous crop, as desired, it is provided with a suitable cutting mechanism indicated as a whole by E. All the mechanisms are operated from a common motor G', by means of suitable transmitting devices and mechanisms, which enable one or more of the mechanisms described to be thrown out of action at the will of the operator.

Referring more specifically to the construction, the frame A, is substantially rectangular in form and conveniently, (though not necessarily), is constructed of flattened metal tubing, and comprises, as shown, end sills or members $a$—$a'$, side sills $a^2$—$a^3$, and center sills $a^4$—$a^5$, all of which are rigidly secured together in any convenient manner to afford extreme rigidity with comparatively light weight, and for this purpose, if desired, the individual frame members may be brazed together, electrically welded, or connected in any other known or suitable manner to afford a rigid construction. Supporting said frame and the mechanisms thereon are gangs of disks B—B'—B²—B³, as shown four in number, though, of course, a greater or a less number of gangs may be employed. Said gangs, as shown, each comprises a plurality of disks $b$, as shown in Fig. 12, which are of comparatively large diameter and the center of which is pressed or forced inwardly, as shown in Fig. 12, to afford a reverse bend or inclination from that shown near the edge of the disk, and which serves very much as the mold board of a plow, in each instance to turn the soil over. Said disks of each gang, as shown, are rigidly secured together on a common axis by means of tubular shaft sections $b'$, provided at their ends with peripheral flanges to receive the bolts therethrough whereby said disks are rigidly held on the shaft and, owing to the construction, bracingly supported from the center outwardly for a distance from the shaft.

As shown, each gang of disks is journaled at the ends in a gang frame B⁴, all of which are constructed in the same manner and each gang frame comprises, horizontal side bars on which the sills of the main frame rest, and end members $b^4$, on a lower plane than the side bars and connected thereto by curved portions. Supported by the end members are the boxings $b^5$, for the gang shafts, as shown in Fig. 2. Each gang of disks is pivotally connected with the main frame, the front gangs each at the rear of the center of its axis and the rear in advance of their axis, whereby said gang frames are adapted to partly rotate beneath the main frame to adjust the respective gangs of disks at a suitable angle for the most efficient work or in turning.

As shown, a worm gear B⁵, is rigidly secured on the middle shaft section of each gang and is of a diameter materially less than the adjacent disks. Said worm gear, as shown, comprises a central disk having seats in its periphery equal distances apart to receive the tapered bases $b^6$, of the roller teeth which project equal distances apart about the periphery of the disk and are provided beyond the periphery with a conical taper and seats to receive rollers $b^7$, arranged around the periphery of said tapered portion. Fitting over said tapered end of the teeth and inclosing the rollers is a conical shell $b^8$, through the top of which extends a stud screw $b^9$, which engages in the base portion of the tooth. As shown, the teeth are held firmly in position in the disk by means of pins $b^{10}$, which extend through the disk and into suitable seats on opposite sides of the base of each tooth, thus rigidly engaging the same in place.

The construction shown in Fig. 11 is substantially the same as that just described, with the exception that the rollers $b^{11}$, are seated in the base of the tooth and engaged on a suitable face in the disk B, and the conical shell $b^{12}$, is engaged in place as before described and may operate with, or independently of the base, as preferred.

Journaled vertically in a cross sill $a^6$, adjacent each gang which connects each of the side sills with the adjacent center sill, is a vertical shaft B⁶, provided on its lower end with a worm $b^{13}$, which meshes the teeth of the worm gear B⁵, and by rotation serves to rotate the disks and propel the machine, and, as shown in Fig. 12, a tight fitting casing $b^{14}$, incloses the worm gear and worm to exclude dirt and refuse therefrom, as shown in Fig. 5, and is provided with an upwardly extending stem $b^{15}$, through which extends the shaft B⁶, and the upper end of which is shaped to afford a part of a ball race, the remaining portion of which is formed in the inner end of a bearing cap $b^{16}$, which fits over said stem, as shown in Fig. 5, and is rigidly bolted to the frame member $a^6$. Extending forwardly, rearwardly and upwardly from the top of the casing are arms $b^{17}$—$b^{19}$, which are bolted to the gang frame. As shown, the pivot shaft B⁶, for the front gangs are journaled at the rear and centrally of the gang, while the pivot shafts B⁶, for the rear gangs are journaled correspondingly, but on the front side of each gang, as shown, in Figs. 1 and 2. Upon the upper end of each of the shafts B⁶, is rigidly engaged a beveled pinion $b^{18}$.

Journaled as shown, centrally of the frame and transversely thereof, is the main driving shaft G, provided with cranks $g$, on which are engaged the connecting rods $g'$, of the motor, which is shown as an explosive engine or hydrocarbon motor having four cylinders G', two of which are arranged on each side of the shaft and which may be coupled with the cranks in pairs, as shown in Fig. 1, or in any other suitable manner. Rigidly secured on said shaft between each center sill and the adjacent side sill are inwardly facing friction disks H—H', and extending upwardly above each sill is a bracket or arm $h$, and supported on the tops thereof and extending for the entire width of the machine is a guide bar $h'$. Slidably supported on the shaft G, between the disks H—H', is a bracket $h^4$, which at its upper end slidably engages the guide bar $h'$. Extending longitudinally the machine from each of said brackets or arms $h^4$, are bosses or hubs $h^5$, (see Fig. 5), in which are rotatably engaged the ends of the shafts $h^6$—$h^7$, whereby the front and the rear gangs are driven, and as shown, the outer ends of said shafts $h^6$—$h^7$, are journaled in suitable ball, pivotal or other bearing boxes to permit slight oscillation adjacent the beveled gear $b^{18}$, and are provided with beveled gears $b^{20}$, thereon, which mesh with said beveled gears. Feathered on the inner end of each of said shafts is a driven friction member H$^4$—H$^5$. As shown, a shifting arm $h^{11}$, rotatably engages the hub of each of said driven friction disks and extends downwardly beneath the friction transmission just described and thence extend horizontally inward and are provided with rack teeth on their adjacent sides, as shown in Fig. 5, each of said racks $h^9$—$h^{10}$, at all times meshes with a pinion $h^8$. Said racks $h^9$—$h^{10}$, extend between suitable guides $h^{12}$—$h^{13}$, which hold the same in unvarying parallel relation each with the other.

Mounted upon a frame, and as shown, centrally at the rear end thereof, is the operator's seat K, and in advance thereof are inclined shafts $k$—$k'$, each for one pair of gangs, and each provided with a hand wheel $k^2$, for actuating the same. As shown, the shaft $k$, extends through the shaft $k'$, which is tubular, thus permitting the hand wheels to be arranged close together and conveniently to the operator's seat. Said shafts respectively are provided with any suitable means as, for instance, beveled pinions $k^{15}$—$k^{15}$, which mesh with bevel pinions $k^{16}$—$k^{16}$ for rotating the shafts $k^3$—$k^4$, which extend transversely the machine and on the outer end of each is a sprocket wheel $k^5$, in alinement with corresponding sprocket wheels $k^{18}$, on the transverse shafts $k^6$—$k^7$, and are connected by sprocket chains $k^{17}$, therewith. Trained about a suitable sprocket wheel $k^9$, on the shaft $k^6$, is a sprocket chain $k^8$, which drives direct to a suitable sprocket wheel $k^{22}$ on the same shaft with the pinion $h^8$, whereby the driven friction disks H$^4$—H$^5$ are shifted outwardly and inwardly.

Secured on the shaft $k^7$, as shown in Fig. 5, is a sprocket wheel $k^{19}$, beneath which, on the parallel shaft $k^{11}$, is provided a sprocket wheel $k^{12}$. Trained about said sprocket wheels $k^{10}$—$k^{12}$, is a suitable sprocket chain $k^{20}$, and also secured on said shaft $k^{11}$, is a sprocket wheel $k^{21}$, in alinement with a suitable sprocket wheel $k^{22}$, connected with the pinion $h^8$, for that transmission (see Figs. 1, 4 and 5), whereby by means of said hand wheels $k^2$, the driven friction disks of either or both transmissions may be shifted either inwardly or outwardly.

Means are also provided for shifting the respective pair of driven friction disks H$^4$—H$^5$, bodily into driving engagement simultaneously with either of the corresponding driving friction disks H—H'. For this purpose, as shown, a bell crank lever $h^{14}$, is pivotally engaged upon the guide bar $h'$, and engages at one end the slide arm $h^4$. The other end is engaged by a rod $h^{15}$, which leads rearwardly and is engaged on a suitable lever $h^{16}$, provided with a notched segment, as shown in Fig. 2, and whereby the operator by shifting this lever in one direction throws both friction disks of the set into engagement with the disk H, and by shifting in the opposite direction, throws both friction disks into engagement with the friction disk H', thus enabling the machine to be driven ahead or reversed, as desired.

Mechanism is provided for varying the angular adjustment of each gang with reference to the machine as a whole, or to the remaining gangs. For this purpose, a stud shaft L, is journaled in a suitable bearing L$^4$, below each side frame member, and rigidly secured thereon is a roller or friction wheel $l$. Pivoted on said shaft is a segment shaped lever L', provided at its lower extremity with an anti-friction roller $l'$, in firm bearing against the friction roller $l$, and on the outer end of the shaft L, is provided a worm L$^2$, which meshes with a worm gear L$^3$, journaled in a depending bracket L$^5$ integral with the bearing L$^4$. Also rotatably engaged upon said segment shaped lever L', and bearing against the friction wheel $l$, is an idler $l^3$, which is in positive bearing also against a driving friction wheel $l^4$, near the upper end of the lever. Said segment shaped lever is so shaped and positioned relatively one of the main driving friction disks H', that when thrown in one direction the lower friction wheel $l'$, is brought into engagement with the driving friction member, as shown in Fig. 6, thus rotating the friction wheel $l$, and worm, while shifting the lever in the opposite direction, and brings the friction wheel $l^4$, into engagement with the driving friction wheel, thus transmitting the drive through the idler $l^3$, to the driven friction $l$, for the worm. Said rollers or driven friction members are so arranged on the levers that the wheels $l$—$l^3$, can never contact the driving friction member, and as shown, where four gangs of disks are employed, each of said friction disks H', is provided with a construction such as described on each side thereof.

Threaded through the worm gear $L^3$, is a shaft $l^5$, provided at its outer end with an eye, to which is shackled a connecting rod $l^6$, which engages a suitable link or eye on the end of the corresponding gang frame, as shown in Figs. 1, 2 and 6. Means are provided for actuating said segment levers to throw either end of either or both of said levers on one side of the machine into engagement at the same time. For this purpose, rods $l^7$, extend rearwardly from each of the levers on each side of the machine, and as shown, are connected with suitable arms $l^8$—$l^9$, on shafts $l^{10}$—$l^{11}$, of which the former shaft extends through the latter, which is tubular. Each of said shafts, as shown, is provided on its end adjacent the operator's seat with a lever $l^{12}$—$l^{13}$, and with any suitable segment or means for holding the lever in adjusted position and whereby with very slight power exerted on the transmission, any gang frame may be swung about on its pivot shaft to vary the angular relation thereof with the frame or with any of the remaining gangs, and it is obvious that the gangs may be shifted in either direction with equal facility dependent upon the adjustment of the segment shaped lever and its friction rollers to the main driving disk H'.

On each outer end of the main shaft G, is rigidly secured a driving friction member M, substantially the same size as the main transmission disks. Also, secured on said shaft is a sleeve $m$, provided with a lateral apertured boss in which is rotatably engaged a shaft $m'$, as shown in Figs. 1 and 2, the rear end of which is supported in a bracket bearing $m^2$, rigidly bolted on the side sill. Beyond said shaft is connected a shaft $m^3$, by means affording a universal joint $m^4$. Said shaft $m^3$, extends into a tubular shaft $m^5$, as shown in Fig. 2, and whereby said shaft section is adapted for variation in length dependent upon the adjustment of the gangs.

Supported upon each rear gang frame, and as shown, below the main frame, is the automatic seed dropping means or seeders C or C'. These are provided one on each side the rear gang frame and may be of any desired type and provided with any interior mechanism for regulating the dropping of the seed of whatsoever kind, and as shown, the interior mechanism of the dropper or seeder is operated from the shaft $m^3$—$m^5$, the rear end of which is provided with a universal joint $m^6$, and with a bevel gear $m^7$, which meshes with a beveled gear $m^{12}$, whereby the mechanism of the seeder is operated. The seeders are thrown into operation by engagement of the driving disk M, and driven transmission friction $m^8$, feathered on the shaft $m'$. For the purpose of adjusting said driven member into and out of engagement with the driving friction, the edge of the driving friction is slightly beveled to afford free entrance of the driven friction thereon, and a rod $m^9$, is yoked at its end to engage the hub of said friction, and extends rearwardly and is connected with a lever $m^{10}$ secured on a shaft $m^{11}$, and provided with a suitable segment whereby the parts may be held in adjusted relation independent of any movement of shifting of the gang frame and whereby the dropping action may be made to continue without interruption during the operation of the machine. Of course, where two seeders are shown, as in the construction illustrated in Figs. 1 and 2, the friction transmission to the seeders is substantially identical on both sides of the machine.

For the purpose of cutting refuse from in front of the machine, a reaping or mowing device E, may be employed, or, if grain is to be cut from a field, to be again plowed and seeded, a self-binder may be attached on the front of the machine. For this purpose, as shown, the front end sill $a$, extends laterally beyond the side sills $a^2$—$a^3$, and is provided at each end with forwardly directed arms or frame members $a^8$—$a^9$, and extending therethrough are threaded shafts $e$, each provided with a hand wheel $e'$, and at their lower ends having threaded engagement in a nut $e^2$, pivotally engaged upon the frame of the cutting table $e^3$, of the cutting mechanism, in this instance shown as a self-binder.

Journaled on the end of the frame transversely thereof is a shaft $e^4$ provided at its inner end with a bevel pinion $e^5$, and at its outer end with a sprocket wheel $e^6$, which projects beyond the side of the frame member $a^9$. Extending downwardly from said shaft $e^4$, is a radius rod $e^7$, which at its lower end engages a shaft $e^8$, said shaft drives the mechanism of the binder both for cutting and binding. Secured on the shaft $e^8$, is a sprocket wheel $e^9$, about which and the sprocket wheel $e^6$, is trained a sprocket chain $e^{10}$, whereby the drive is transmitted to the cutting mechanism. As shown, the end of the shaft G, beyond the driving friction disk M, is provided with a sleeve $m^{15}$, having oppositely disposed seats in each side thereof, one to receive the end of the shaft $m'$, as before described for operating the seeder, the other to receive the end of the shaft $e^{11}$, which extends forwardly through a suitable bearing $e^{12}$, secured to the side of the frame, and through a bracket $e^{13}$, and is provided with a beveled pinion $e^{14}$ on its extremity, which meshes with the beveled pinion $e^5$, before described to drive the cutting mechanism.

The cutting mechanism is in or out of operation dependent if the driven friction disk $e^{15}$, is or is not in engagement with the driving friction member M. For this purpose, said driven friction member is splined or feathered on the shaft $e^{11}$, and its hub is engaged by a yoke secured on a rod $e^{17}$, the rear end of which is connected with a lever $e^{19}$, engaged on a shaft $e^{18}$, concentric with the shaft $e^{13}$, connected with the friction for the seeder on that side of the machine, and the shaft $e^{18}$, is provided at its opposite end with a hand lever $e^{20}$, and segment, such as before described whereby the driven friction disk may be shifted into or out of engagement with the driving friction disk to throw the cutting means into or out of operation, as preferred, and the lever $e^{14}$, is connected to operate the shaft $e^{13}$, and is provided with a segment.

Means are provided for tilting the cutter bar of the reaper or cutting mechanism downwardly to cut closer to the ground or to elevate the same, as preferred. For this purpose, a bracket N, extends upwardly from the frame of the cutting mechanism and connected therewith is a rod $n$, which leads rearwardly to a lever $n'$, secured on the shaft $n^2$, concentric with the shafts $e^{13}$, and $e^{18}$, which is also provided with a suitable hand lever $n^3$, and segment adjacent the operator's seat and whereby the adjusting rod may be actuated.

As shown, to relieve the stress on the mechanism in part, a strong coiled spring $n^4$, is inserted in said rod and by imparting resiliency thereto prevents breakage because of the striking of the machine against obstructions.

The seeder or planting mechanism is provided beneath each of the seed boxes and at the rear of the disks upon which the same are carried, with boots or spouts O, provided at the lower end with an enlarged extension $o$, adapted to be adjusted upwardly or downwardly dependent upon the depth at which it is desired to plant the seed. For the purpose of adjustment a rod $o'$, is pivotally engaged on the lower or extension end of each boot, and is connected with the arm $o^2$, secured on a shaft $o^3$, extending transversely the machine as shown in Fig. 5, and as shown, a lever $o^4$, is provided on the machine adjacent the operator whereby said boots or pipes may be lengthened or shortened dependent upon the depth required to deposit the seed.

Covering means are provided at the extreme rear end of the machine. For this purpose, a shaft P, extends transversely the machine supported upon suitable brackets P', and is provided with an arm $p$, which extends upwardly and rearwardly and is connected in any suitable manner, as, for instance, with the bar $p'$, with an operating lever $p^2$, on the machine, and whereby the shaft may be partly rotated to raise the covering means from the ground. Rigidly secured on the shaft are depending spring fingers or plates $p^3$, which serve to stir the soil and to cover the dropped seed.

The operation is as follows: Should the ground be covered with a crop that it is desired to gather, as, for instance, wheat or other cereal, or grass, or even with weeds or other refuse, the cutting mechanism is employed and is supported upon a frame as illustrated in Figs. 1, 2 and 13, to permit the same to be adjusted to the desired height at which the material is to be cut, and for this purpose, of course, the connection of the cutter frame with the frame of the machine admits of tilting the cutters downwardly, should it be so desired.

The propelling and supporting means for the main frame, namely, the gangs, are in the present construction shown as four in number, although a machine with a single gang of disks front and rear operates admirably. Said gangs may, by means of the shifting mechanism before described, be arranged in any desired angular relation with each other or with the main frame. This is particularly important inasmuch as the angular relation of the axes of the gangs to the main frame or the line of travel determines the cut of the disks, said disks having very slight cutting effect when arranged with the axes at right angles with the line of travel, as shown in Fig. 1, and the cutting effect increases as well as the ability of the disks to turn a furrow when said disks are arranged with the axes obliquely directed with reference to the line of travel. Any suitable means may be provided, of course, for accomplishing this adjustment. Owing, however, to the stress exerted upon the disks in plowing or preparing the soil, a shifting mechanism of considerable power is required and for this purpose the worm $L^2$, and worm gear $L^3$, are employed and these are actuated in either direction by shifting the segment shaped levers L', said worms being driven in one direction when the friction wheels $l^4$, engage with the driving friction members H', transmitting the drive through the idlers $l^3$, to the friction wheels $l$, and in the opposite direction when the friction wheels $l'$, engage the driving friction members H', as shown in Fig. 6, and of course, any convenient arrangement of levers for the purpose of actuating said segment shaped levers into or out of engagement with the friction disks may be employed. In either adjustment the worm gear is rotated thereby. If rotated in one direction, threading the shaft $l^5$, through the worm gear $L^3$, it swings the outer end of the gang frame forwardly or rearwardly dependent upon the direction or rotation, and said gang frames, as shown, are arranged oppositely from each other or slightly staggered on opposite sides of the frame to permit the necessary adjustment with reference to each other without the one contacting the other. This adjustment is, of course, facilitated for the reason that each gang frame is engaged with the main frame by means of the shaft $B^6$, as shown in Fig. 5, to permit said gang frames to swing freely in adjusting, and, as shown, the simple and exceedingly effective roller worm gear secured between the central pair of disks and positively engaging or meshing with the worm on the lower end of the shaft, enables the gangs to be turned with a minimum of frictional resistance aside from that encountered from the soil.

By utilizing the shaft $B^6$, as the pivot shaft for the gang frames, it is not necessary to provide a coupling of any kind in the driving shaft $h^6$. It is only necessary to provide means for varying the rate of drive by shifting the driven friction disks $H^4$—$H^5$ toward the center for slow speed and toward the periphery of the driving frictions for a higher speed. This is accomplished by the racks before described and positively actuated by means of the hand wheels $k^2$, whereby the driven friction wheels for each transmission are adjusted independently of the driven friction wheels for the other transmissions.

In adjusting or swinging the driving shafts to bring the driven frictions $H^4$—$H^5$, into engagement with either the driving friction H, or driving friction H', the bell crank lever serves to slide said wheels over bodily to bring the same into very positive engagement with the proper driving friction wheel and this is controlled also from the operator's seat. The power transmitted from the engine to the disks by said transmissions serves to propel the machine, said disks serving as wheels for the machine and opening the soil as well, for the seed to be deposited. In new ground, or ground where more or less of refuse may be upon the surface, or when the surface is covered with a thick sod, it is desirable that the disks of the front gangs be scalloped or notched on the peripheries to afford a drawing cut as they rotate into or onto the materials to be severed.

The seed dropping mechanisms may, of course, be of any desired kind and may be for any kind or sort of seed. Preferably, one of such seed dropping mechanisms is carried upon each rear gang frame and the mechanism thereof actuated by the shaft $m'$—$m^3$—$m^5$, which is driven from the supplemental driving transmission disk M, before described. When the friction wheels $m^8$, are in engagement with said driving disk, the shaft is rotated, in turn driving the gears or other elements whereby the dropping mechanism is operated. Should it at any time be desired to stop the action of the dropping or seeding mechanism, this may be accomplished by means of the lever $m^{10}$, whereby said driven friction wheels $m^8$, may be retracted from the driving friction M.

Extending downwardly between the disks of each gang are the dropping boots indicated by $o$, into which extends the pipe O, to deliver the seed therethrough into the furrow opened by the disks. As shown, said pipes or boots are made in two sections, the lower or larger being adapted to telescope over the upper or smaller, which extends thereinto, said lower section being connected by means of a rod $o'$, with the bell crank $o^2$, operated in any suitable manner to lift said lower section of the boot or dropping pipe and to support the same in the desired position to enable the depth in the soil to be gaged.

At the rear of the dropping mechanism is the covering mechanism consisting of more or less resilient fingers, which serve to pulverize the soil as well as distribute the same evenly over the seed just dropped in advance thereof.

All the mechanisms described are operated from a single source of power, supported upon the main frame, a gas engine of suitable size being employed for this purpose and the machine is automobile to the extent that its operation is under its own power, and all the mechanisms being operated simultaneously first to strip refuse or other material from the soil, after which the supporting wheels for the automobile frame, namely, the gangs of disks serve to cut the sod and open the soil in advance of the seed dropping means, the seed being dropped at the rear of each rear disk of each gang to the desired depth owing to said adjustment of the dropping pipe and immediately covered by the resilient covering mechanism or fingers, which not only assist in pulverizing the soil, but assist in placing the soil evenly over the planted area.

It is obvious from the construction described that by a single automobile planting machine driven by a motor supported thereon, the refuse or other material may be cut in the path of the machine, a wide strip of the surface of the soil being also turned over or plowed and opened by the action of the disks and that before the furrow is closed by the rear covering mechanism the seed is automatically deposited therein, after which the further progress of the machine serves to thoroughly cover the seed and to smooth and pulverize the surface of the soil. All said elements coöperate to the one single, central purpose of enabling the agriculturalist to satisfactorily prepare the land and plant a very large acreage in the most uniform and the most acceptable manner in the briefest possible space of time. It is to be observed that the gangs of disks serve as the supporting wheels of an automobile, and serve not only to move the machine forward in plowing, but also serve the purpose of plows to effectively and perfectly turn the soil, this operation being facilitated by centrifugal force and the peculiar compound curve on the inner faces of the disks themselves, which tends to throw the soil over as it rises in the disk.

In turning the machine, the angularity of one set of gangs relative to the remaining pair assists materially. This may also be assisted by the increasing of the rate of drive for the gangs on the outer side of the circle or arc formed in turning, or, if desired, the gangs on one side of the machine may be slightly reversed and the gangs on the other side driven ahead with the result of turning quite short about.

Of course, I am well aware that many of the details of construction and the particular connections and actuating means for the various devices and mechanisms embraced in my invention may be modified through a very wide range—for instance, instead of friction transmission devices, geared or any other suitable transmission devices may be employed without departing from the principles of my invention, and obviously it is quite immaterial how many gangs of disks be employed in opening the soil so long as the machine is partly supported upon, and wholly or partly propelled by the disks.

Of course, also, while I have shown a self-binding harvester on the front end of the machine, any suitable cutting mechanism may be employed instead to cut the material that would otherwise cause annoyance and delay or a standing crop or hay as the machine encounters the same.

Of course, too, it is evident that although disks of a particular shape are shown, other forms of disks may be employed and operate very satisfactorily.

I claim as my invention:

1. In a machine of the class described a frame, a motor thereon, gangs of traction and plowing disks arranged in pairs and supporting said frame and motor, each gang independently adjustable on a vertical axis beneath the frame and embracing a plurality of concave disks having the center thereof dished reversely, shaft sections connecting all of said disks in each gang together, and operative connections with the motor for driving each pair of gangs independently and also simultaneously.

2. In a machine of the class described a frame, a motor thereon, front and rear gangs of traction and plowing disks adjustably supporting said frame and adjustable independently therebeneath, each of said gangs comprising a plurality of concave disks faced in the same direction and having the center thereof sprung to nearly the plane of the periphery, and tubular shaft sections rigidly connecting the disks at the axis and serving as the shaft therefor and independent driving connections between the motor and the front and rear gangs of disks.

3. In a machine of the class described a frame, a motor thereon, a plurality of gangs of plowing disks supporting the frame, and independently adjustable beneath the same, each gang comprising a frame, a plurality of concave plowing disks journaled therein, tubular shaft sections connecting the disks and holding the same equal distances apart, an anti-friction gear wheel rigidly secured on the middle section of said shaft, a vertical pivot shaft on which the frame of the gang turns, a worm on said pivot shaft meshing with said gear on the gang shaft, a casing inclosing both worm and gear, and means driven from the motor for rotating said pivot shaft and thereby the gang to propel the machine and operate the plows.

4. A machine of the class described embracing a frame, a motor thereon, a plurality of gangs of plowing disks pivoted to the frame at one side the axis of rotation of the disks and driven by the motor, and adapted to propel the machine as wheels, and power operated means for adjusting the same relatively to the frame to vary the cut.

5. A machine of the class described, embracing a frame, a motor, a plurality of gangs of plowing disks, an independent frame for each, a worm gear, rigidly secured on the gang shaft centrally, a shaft journaled in the main frame, a worm on said shaft meshing said worm and affording a pivot connection between the gang and frame, operative connections for rotating said shaft from the motor, and power operated means for adjusting said gangs individually with reference to the main frame.

6. In a machine of the class described a frame, a motor thereon, front and rear plowing gangs each embracing a frame, a plurality of plowing disks journaled therein, a vertical shaft journaled in the frame and in the disk frame, operative connections rotating the same from the motor, a worm on the lower end of said shaft, a worm gear on the gang shaft meshing with said worm, and mechanism operated by the motor for swinging said gang or gangs each on the vertical shaft on which the same is pivoted.

7. In a machine of the class described a main frame, a motor thereon, front and rear gang frames supporting the same, a vertical shaft for each gang frame journaled in the main frame and in said gang frame and affording a pivotal connection therebetween, a worm on the lower end of said pivot shaft, a disk shaft journaled horizontally in the gang frame, plowing disks thereon, a worm gear secured at the center of the shaft and meshing with a worm on the pivot shaft, a casing surrounding both worm and worm gear, a friction wheel driven by the motor and a thrust rod engaged on the gang frame and driven thereby, acting to adjust the gang relatively the main frame.

8. In a machine of the class described a main frame, a motor thereon, a shaft driven thereby, friction disks secured on the shaft, a plurality of gangs of disks pivoted below the frame to support the same, an operative connection for rotating said disks in either direction, a friction disk driven by one of the friction disks on the main shaft, a worm gear driven thereby, said gear having a central threaded aperture therethrough, a thrust rod pivotally engaged at the end of each gang and having threaded engagement in said gear at its opposite end, levers for the respective friction disks for the respective gangs, whereby any and all of said gangs may be adjusted relatively the main frame.

9. In a machine of the class described the main frame, a motor thereon, a transverse shaft driven thereby, a plurality of friction wheels secured on the shaft, front and rear plowing gangs supporting the main frame and motor, vertical pivot shafts affording the connection therebetween and the means for transmitting the power of the motor thereto to rotate the disks, a friction disk for each gang adapted for engagement with the driving friction on said main shaft, a worm and gear driven by each, a threaded thrust rod pivotally engaged on the end of each gang having threaded engagement through the appropriate worm gear for that gang, and levers adapted to be positively actuated to force said friction disk on each engagement with the friction wheel.

10. In a machine of the class described a frame, gangs of plowing disks journaled to and supporting the frame, a motor on the frame, a drive shaft, sets of facing friction disks on the drive shaft, a plurality of pairs of driven shafts, one shaft of each pair connected to drive one of the gangs of plowing disks, each pair of shafts having their inner ends projecting between one of the sets of facing friction disks, friction disks on the ends of the driving shafts between the facing friction disks and means for adjusting the inner ends of each set of drive shafts to adjust the friction disks thereon to contact opposite friction disks on the drive shaft.

11. In a machine of the class described a frame, gangs of plowing disks journaled to, and supporting the frame, a motor on the frame, a drive shaft, sets of facing friction disks on the drive shaft, a plurality of pairs of driven shafts, one shaft of each pair connected to drive one of the gangs of plowing disks, each pair of shafts having their inner end projecting between one of the sets of facing friction disks, friction disks on the ends of the driving shafts between the facing friction disks, means for adjusting the inner ends of each set of drive shafts to adjust the friction disks thereon to contact opposite friction disks on the drive shaft, a reciprocating shaft connected with each gang of plowing disks adapted by reciprocation thereof to adjust the position of the respective gangs of disks, and mechanism operated by part of the friction disks on the drive shaft for reciprocating said shafts.

12. In a machine of the class described a main frame, a motor thereon, a shaft driven thereby, friction wheels thereon, front and rear gangs of plowing disks supporting and propelling the machine, means operated from one or more of the frictional wheels of the shaft for rotating the plowing disks, and mechanism operated also by the friction wheels on said shaft for shifting the gangs relatively to the main frame.

13. In an agricultural machine a frame, an engine thereon, inwardly facing driving friction members driven by the engine, sets of disk plows journaled to the frame, driven friction members between the driving friction members, one for operating each set of disk plows, operative connections between each driven friction member and the respective set of disk plows, mechanisms for independently turning the gangs of disks and friction members for actuating said mechanisms.

14. An agricultural machine comprising a frame, a motor thereon, a drive shaft, a plurality of sets of inwardly facing driving friction members thereon, driven shafts, a driven friction member on each engaged between the appropriate pair of driving friction members, a plurality of sets of disk plows, vertical shafts, one driven by each of said driven shafts and each vertical shaft affording the pivot for one of the sets of disk plows, means rotating each set of disks from the vertical shaft, a shaft pivotally connected with the end of each set of disks and mechanism for adjusting the shaft longitudinally of the frame to adjust the sets of disks.

15. In a power operated agricultural machine a frame, a motor thereon, vertical shafts journaled to the frame, sets of plows, one set journaled on each vertical shaft, means for independently turning the sets of plows on the shafts, driving friction members actuated by the motor, driven shafts, each adapted to actuate one of the vertical shafts, a driven friction member adjustable on each driven shaft adapted to contact one of the driving friction members, pivotally mounted sets of friction members, one set for each set of plows adapted to be driven from the driving friction members, shafts adapted to be actuated by the sets of friction members and shafts operated from said shafts and connected to adjust the position of the sets of plows.

16. In a machine of the class described a frame, a motor on the frame, sets of plows and each set rotatable as a whole, shafts, one affording the pivot for each set of plows, a worm on each shaft, a worm wheel for actuating each set of plows having anti-friction teeth, coacting driving and driven friction members operatively connected to actuate the shafts, means for adjusting the driven friction members to vary the rate of drive, sets of friction members adapted to contact the periphery of the appropriate driving friction members and mechanism actuated by said sets of friction members for rotating the sets of plows on the pivot shafts.

17. In an agricultural machine a frame, a motor thereon, a drive shaft driven by said motor, pairs of friction members on said drive shaft, sets of disk plows pivotally secured to the frame, pairs of alined driven shafts for actuating the sets of disk plows, one driving each set of disk plows having a pivotal bearing at one end, pairs of driven friction members secured on each pair of alined driven shafts, means for adjusting each pair of driven friction members oppositely each to engage one of the appropriate opositely disposed driving friction members.

18. In an agricultural machine a frame, a motor thereon, a drive shaft driven by said motor, pairs of friction members on said drive shaft, sets of disk plows pivotally secured to the frame, pairs of alined driven shafts for actuating the sets of disk plows, one driving each set of disk plows having a pivotal bearing at one end, pairs of driven friction members secured on each pair of alined driven shafts, means for adjusting each pair of driven friction members, oppositely each to engage one of the appropriate oppositely disposed driving friction members, reversible friction mechanisms adapted to contact the periphery of the appropriate driving friction members and mechanism actuated thereby for turning the pivotally supported sets of plow disks.

19. In an agricultural machine a frame, a motor thereon, a drive shaft driven by said motor, pairs of friction members on said drive shaft, sets of disk plows pivotally secured to the frame, pairs of alined driven shafts for actuating the sets of disk plows, one driving each set of disk plows and having a pivotal bearing at one end, pairs of driven friction members secured on each pair of alined driven shafts, means for adjusting each pair of driven friction members oppositely, each to engage one of the appropriate oppositely disposed driving friction members, reversible friction mechanisms adapted to contact the periphery of the appropriate driving friction members, mechanism actuated thereby for turning the pivotally supported sets of plow disks.

20. In a device of the class described a frame, gangs of disks adjustably secured thereto, an offset worm drive for each gang forming a pivot center therefor, and power operated mechanism for adjusting the gangs of disks around said pivot center.

In testimony whereof I have hereunto subscribed my name in the presence of two subscribing witnesses.

ALBERT E. COOK.

Witnesses:
CHARLES W. HILLS,
K. E. HANNAH.